US011372839B2

(12) United States Patent
Kamimura et al.

(10) Patent No.: US 11,372,839 B2
(45) Date of Patent: Jun. 28, 2022

(54) ANOMALOUS EVENT CONFIRMATION ASSISTANCE APPARATUS, ANOMALOUS EVENT CONFIRMATION ASSISTANCE MEITHOD, AND RECORDING MEDIUM

(71) Applicant: NEC Corporation, Tokyo (JP)

(72) Inventors: Junpei Kamimura, Tokyo (JP); Koji Kida, Tokyo (JP); Kazuhiko Isoyama, Tokyo (JP); Yuji Kobayashi, Tokyo (JP); Hiroki Tagato, Tokyo (JP); Etsuko Ichihara, Tokyo (JP); Yoshiaki Sakae, Tokyo (JP)

(73) Assignee: NEC CORPORATION, Tokyo (JP)

( * ) Notice: Subject to any disclaimer, the term of this patent is extended or adjusted under 35 U.S.C. 154(b) by 739 days.

(21) Appl. No.: 15/779,580

(22) PCT Filed: Dec. 1, 2016

(86) PCT No.: PCT/JP2016/085682
§ 371 (c)(1),
(2) Date: May 29, 2018

(87) PCT Pub. No.: WO2017/094820
PCT Pub. Date: Jun. 8, 2017

(65) Prior Publication Data
US 2020/0301907 A1     Sep. 24, 2020

(30) Foreign Application Priority Data

Dec. 2, 2015   (JP) .............................. JP2015-235364

(51) Int. Cl.
*G06F 16/23* (2019.01)
*G06F 16/901* (2019.01)

(52) U.S. Cl.
CPC ...... *G06F 16/2365* (2019.01); *G06F 16/9024* (2019.01)

(58) Field of Classification Search
CPC ........................ G06F 16/2365; G06F 16/9024
See application file for complete search history.

(56) References Cited

U.S. PATENT DOCUMENTS

2004/0250169 A1   12/2004   Takemori et al.
2012/0150873 A1    6/2012   Tokai
(Continued)

FOREIGN PATENT DOCUMENTS

JP   2004-318552 A   11/2004
JP   2012-128479 A    7/2012
(Continued)

OTHER PUBLICATIONS

Takada, Tetsuji & Hideki Koike, "Tudumi: Information Visualization System for Monitoring and Auditing Computer Logs", Proceedings of the 6th International Conference on Information Visualisation (Year: 2002).*
Frei, Adrian & Marc Rennhard, "Histogram Matrix: Log File Visualization for Anomaly Detection", The 3rd International Conference on Availability, Reliability, and Security, pp. 610-617 (Year: 2008).*

(Continued)

*Primary Examiner* — Scott A. Waldron
(74) *Attorney, Agent, or Firm* — Sughrue Mion, PLLC

(57) ABSTRACT

The purpose of the present invention is to provide a technology which assists a verifying party in ascertaining an anomaly in an event of which notification has been made. Provided is an assistance device, comprising: an acquisition unit which acquires as an associated event, from among events which take place among a plurality of elements, and with respect to elements which have been associated with an event which has been detected as an anomalous event, an event other than the anomalous event which has been associated with the elements; and a generating unit which, on the basis of the anomalous event and the associated event, generates a relational graph in which the elements are vertices, the relations among the elements are edges, the anomalous event and the associated event are respectively represented, and the associated event is displayed in a (Continued)

display screen in a different manner from the manner in which the anomalous event is displayed.

15 Claims, 12 Drawing Sheets

(56) References Cited

U.S. PATENT DOCUMENTS

| | | |
|---|---|---|
| 2014/0237297 A1 | 8/2014 | Nagura et al. |
| 2016/0299958 A1* | 10/2016 | Kumar ................ G06F 16/1805 |
| 2016/0371489 A1* | 12/2016 | Puri .................... H04L 63/1425 |
| 2017/0063902 A1* | 3/2017 | Muddu ............... H04L 63/1441 |
| 2017/0075746 A1 | 3/2017 | Nomura et al. |
| 2017/0093900 A1 | 3/2017 | Nomura et al. |
| 2017/0132060 A1 | 5/2017 | Nomura et al. |

FOREIGN PATENT DOCUMENTS

| | | |
|---|---|---|
| WO | 2013/140608 A1 | 9/2013 |
| WO | 2015/140843 A1 | 9/2015 |
| WO | 2015/141220 A1 | 9/2015 |
| WO | 2015/141221 A1 | 9/2015 |

OTHER PUBLICATIONS

Tominski, Christian, et al., "Interaction Support for Visual Comparison Inspired by Natural Behavior", IEEE Transactions on Visualization and Computer Graphics, vol. 18, No. 12, Dec. 2012, pp. 2719-2728 (Year: 2012).*

International Search Report for PCT Application No. PCT/JP2016/085682, dated Feb. 7, 2017.

English translation of Written opinion for PCT Application No. PCT/JP2016/085682.

* cited by examiner

ANOMALOUS EVENT CONFIRMATION ASSISTANCE APPARATUS, ANOMALOUS EVENT CONFIRMATION ASSISTANCE MEITHOD, AND RECORDING MEDIUM This application is a National Stage Entry of PCT/JP2016/085682 filed on Dec. 1, 2016, which claims priority from Japanese Patent Application 2015-235364 filed on Dec. 2, 2015, the contents of all of which are incorporated herein by reference, in their entirety.

TECHNICAL FIELD

The present disclosure relates to an assistance apparatus, an assistance method, and a recording medium.

BACKGROUND ART

A technique for monitoring a system and detecting an anomaly has been disclosed. For example, PTL 1 discloses an apparatus that extracts a log different from a usual log from among logs output from an intrusion detection system (IDS) and evaluates a degree of abnormality thereof.

PTL 2 describes a method for automating generation of rules for detecting a failure by using a failure occurrence history and a history of cause analysis about occurred failure.

CITATION LIST

Patent Literature

PTL 1: Japanese Laid-open Patent Publication No. 2004-318552
PTL 2: International Publication No. WO2013/140608

SUMMARY OF INVENTION

Technical Problem

An administrator of a system is informed of a detected anomaly. Then, the administrator who has been informed of the anomaly usually takes a required action.

However, when anomaly detection is performed by a high-level algorithm, it is not easy for the administrator to interpret why an event informed as the anomaly is anomalous.

The techniques described in PTLs 1 and 2 merely informed that an event is anomalous. In other words, PTLs 1 and 2 do not disclose that the administrator ascertains an anomaly in an event informed as the anomaly. The techniques described in PTLs 1 and 2 therefore cannot allow an administrator to ascertain the event informed as the anomaly is what kind of anomaly.

The present disclosure has been made in light of the problem described above and an object thereof is to provide a technique for assisting a verifying party (for example, an administrator who manages a system to be monitored) in ascertaining an anomaly in an event of which notification has been made.

Solution to Problem

An assistance apparatus according to one aspect of the present invention includes acquisition means for acquiring, for an element related to an event detected as an anomalous event among events between a plurality of elements, an event that is related to the element and is different from the anomalous event, as a related event; and generation means for generating, based on the anomalous event and the related event, a relational graph that has the element as a vertex and a relation between the elements as a side and represents each of the anomalous event and the related event, in which the related event is displayed on a display screen in a mode different from a mode of the anomalous event.

An assistance method according to one aspect of the present invention includes acquiring, for an element related to an event detected as an anomalous event among events between a plurality of elements, an event that is related to the element and is different from the anomalous event, as a related event; and generating, based on the anomalous event and the related event, a relational graph that has the element as a vertex and a relation between the elements as a side and represents each of the anomalous event and the related event, in which the related event is displayed on a display screen in a mode different from a mode of the anomalous event.

Note that a computer program for causing a computer to implement the above-described apparatus or method, and a computer-readable non-transitory recording medium storing the computer program are also encompassed in the scope of the present invention.

Advantageous Effects of Invention

According to the present disclosure, it is possible to assist a verifying party in ascertaining an anomaly in an event of which notification has been made.

DESCRIPTION OF EMBODIMENTS

First Example Embodiment

Figure 1:
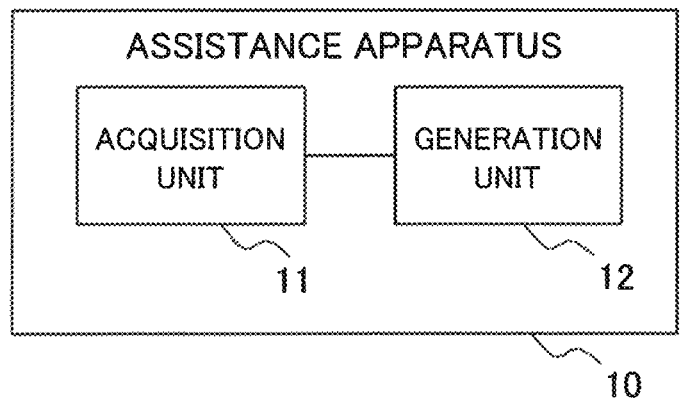
FIG. 1 is a functional block diagram illustrating an example of a functional configuration of an assistance apparatus according to a first example embodiment of the present disclosure.

A first example embodiment of the present disclosure will be described in detail with reference to drawings. FIG. 1 is a functional block diagram illustrating an example of a functional configuration of an assistance apparatus 10 according to the first example embodiment of the present disclosure. Note that the assistance apparatus 10 illustrated in FIG. 1 illustrates a configuration that is characteristic of the present disclosure and the assistance apparatus 10 illustrated in FIG. 1 may have a block that is not depicted in FIG. 1, of course.

As illustrated in FIG. 1, the assistance apparatus 10 according to the present example embodiment includes an acquisition unit 11 and a generation unit 12. The acquisition unit 11 receives anomalous event information indicating an anomalous event. The anomalous event is an event that is likely to be anomalous and has been detected from a log which is a result of monitoring of a system to be monitored. The log contains information indicating an event between elements. The log is stored in a storage unit, not depicted.

The acquisition unit 11 identifies an element related to an anomalous event and acquires information concerning an event other than the anomalous event that is related to the element from the log. For example, the acquisition unit 11 acquires information concerning an event other than the anomalous event to which at least one of elements related to the anomalous event is related from the log.

Then, the acquisition unit 11 provides the acquired information concerning the event (related event information) to the generation unit 12 along with the anomalous event information.

The generation unit 12 receives the anomalous event information and the related event information from the acquisition unit 11. The generation unit 12 generates relational graphs representing the anomalous event indicated by the anomalous event information and a related event indicated by the related event information. Each of the relational graphs is a graph in which elements are represented by vertices and a relation between the elements is represented by a side. The generation unit 12 generates the relational graphs in such a way that the related event is displayed on a display screen in a mode different from that of the anomalous event.

In this way, for example, relational graphs to be displayed on a display screen of a display device, which is not depicted, represent a detected anomalous event and a related event related to the anomalous event. The related event is a normal event that is determined to be normal since the event is other than the anomalous event.

Accordingly, a verifying party (for example, an administrator of the system to be monitored) who checks the display screen can check the anomalous event and the normal event at the same time. This allows the verifying party to compare the anomalous event that has occurred with the normal event. Accordingly, the verifying party can readily ascertain that the anomalous event is anomalous. This allows the verifying party to determine whether or not the anomaly indicated by the anomalous event requires action.

As described above, the assistance apparatus 10 according to the present example embodiment is capable of assisting a verifying party in ascertaining an anomaly in an event of which notification has been made.

Second Example Embodiment

Figure 2:
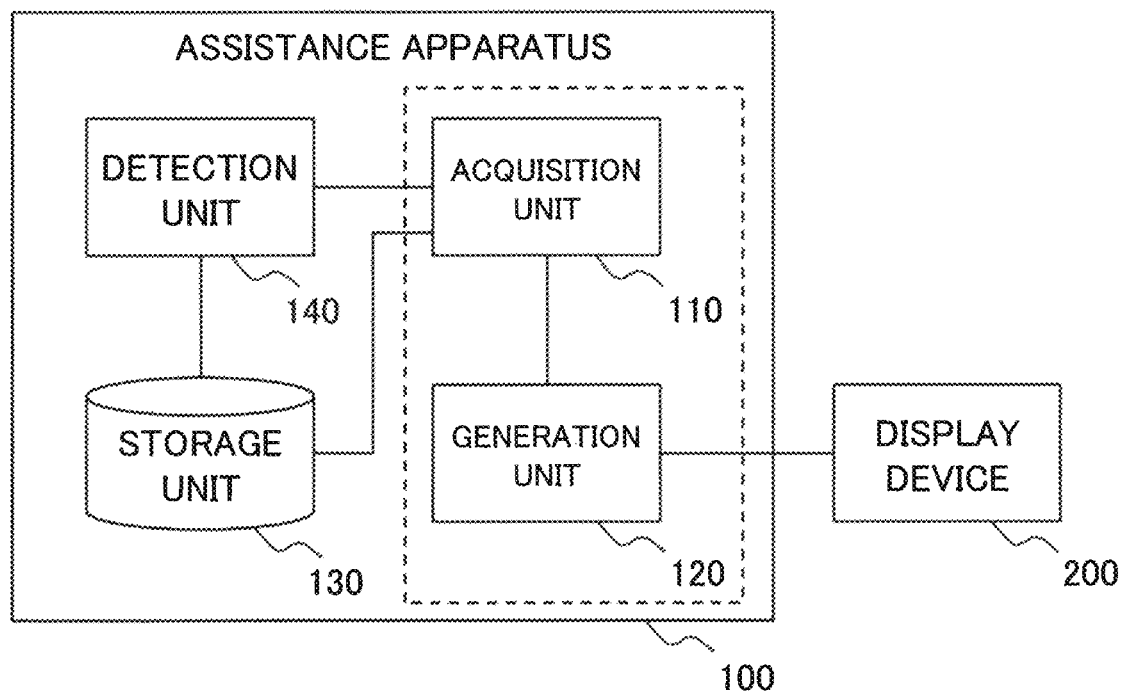
FIG. 2 is a functional block diagram illustrating an example of a functional configuration of an assistance apparatus according to a second example embodiment of the present disclosure.

A second example embodiment which is based on the first example embodiment described above will be described next. First, a configuration of an assistance apparatus 100 according to the present example embodiment will be described. FIG. 2 is a diagram illustrating an example of a functional configuration of the assistance apparatus 100 according to the present example embodiment. As illustrated in FIG. 2, the assistance apparatus 100 according to the present example embodiment includes an acquisition unit 110, a generation unit 120, a storage unit 130 and a detection unit 140.

The acquisition unit 110 and the generation unit 120 relates to the acquisition unit 11 and the generation unit 12, respectively, in the first example embodiment described above. In other words, a part enclosed in a dashed-line frame in FIG. 2 relates to the assistance apparatus 10 in the first example embodiment described above.

Further, as illustrated in FIG. 2, the assistance apparatus 100 connects to a display device 200. While the present example embodiment will be described by taking an example in which the assistance apparatus 100 is configured as an apparatus separate from the display device 200, the assistance apparatus 100 may be configured to include the display device 200 as a display unit provided inside the assistance apparatus 100.

A result (a log) of monitoring of a system to be monitored, not depicted, is stored in the storage unit 130. While description will be made in FIG. 2 by taking an example in which the storage unit 130 is provided inside the assistance apparatus 100, the storage unit 130 may be implemented by a storage device separate from the assistance apparatus 100.

The system to be monitored includes a plurality of hosts (nodes) connected via a network. The log contains a result (information indicating an event) of detection of an event between a plurality of elements monitored on the system to be monitored. An element may be any of a host, a process, a file and an account. When two elements are hosts, an event between elements is, for example, that data are transmitted. Further, when one of elements is a process and the other is a file, an event between the elements is, for example, that the process is accessed to the file. Moreover, when one of elements is an account and the other is a process, an event between the elements is, for example, that the process is executed by the account. Note that an event between elements is not limited to these.

While the present example embodiment will be described on the assumption that one event is an event between two elements, one event may be an event that occurs among a plurality of elements.

The detection unit 140 detects an event that is likely to be anomalous from the log stored in the storage unit 130. The detection unit 140 provides information (anomalous event information) indicating the result of the detection (anomalous event) to the acquisition unit 110. The anomalous event information may be information itself indicating the event which is contained in the log. Alternatively, the anomalous event information may include at least an identifier identifying the detected anomalous event (referred to as an event identifier (ID)) and information identifying elements related to the anomalous event (element information). Further, the anomalous event information may include other information. For example, the anomalous event information may include information representing a time instant at which an anomalous event has occurred. Hereinafter, an element related to an anomalous event will be also referred to as an element of an anomalous event.

Examples of events detected by the detection unit 140 as being likely to be anomalous are given below. Note that events detected by the detection unit 140 are not limited to the following events.

(a) When one of elements is a process and the other is a file, an event in which the process has accessed the file that the process usually does not access,
(b) When one of elements is a process and the other is a host, an event in which the process has performed communication with the host for the first time,
(c) When both of elements are hosts, an event in which communication between the hosts has been performed for the first time,
(d) When both of elements are processes, an event in which one of the processes has activated the process that the process usually does not activate, and
(e) When one of elements is an account and the other is a process, an event in which the account has activated the process for the first time.

The acquisition unit 110 receives the anomalous event information from the detection unit 140. The acquisition unit 110 acquires information (related event information) concerning an event related to elements identified by element information included in the received anomalous event information from the log stored in the storage unit 130. Note that the event indicated by the related event information (related event) is an event related to elements of the anomalous event. The related event is an event other than the anomalous event indicated by the anomalous event information. In other words, the related event is an event that has not been detected as an anomalous event among the events contained in the log and that relates to a certain anomalous event and therefore will be also referred to as a normal event or a usual event. Hereinafter, related event information indicating a related event will be also referred to as surrounding information of an anomalous event.

The acquisition unit 110 provides the related event information and the anomalous event information to the generation unit 120 in association with each other. Like anomalous event information, the related event information may be information itself indicating an event which is acquired from the log or may be information including, for example, at least an event ID and element information related to the event ID.

Note that when the acquisition unit 110 acquires related event information from the log, the acquisition unit 110 may store an element related to a certain element in the storage unit 130 or the like, for example. The acquisition unit 110 may then periodically update the stored information. For example, the acquisition unit 110 may store a list of files that are accessed by a certain process, which is extracted from the log, in the storage unit 130.

Further, when the acquisition unit 110 acquires surrounding information of an anomalous event, the acquisition unit 110 may use, for example, information indicating a type of the anomalous event and elements related to the anomalous event, stored in the storage unit 130 or the like. This allows the assistance apparatus 100 to reduce the time required for acquiring a related event.

Further, the acquisition unit 110 may be configured to accept information indicating an anomalous event specified by an administrator or the like among anomalous events through an input device, not depicted, and to acquire surrounding information of the anomalous event.

The generation unit 120 receives the related event information and the anomalous event information. Based on the related event information and the anomalous event information, the generation unit 120 generates a relational graph representing a relation between the elements indicated by the element information included in the related event information and the anomalous event information. The relational graph includes the elements as vertices (also referred to as node points), and a line connecting the elements as a side (also referred to as a link, an edge or a branch).

Figure 3:
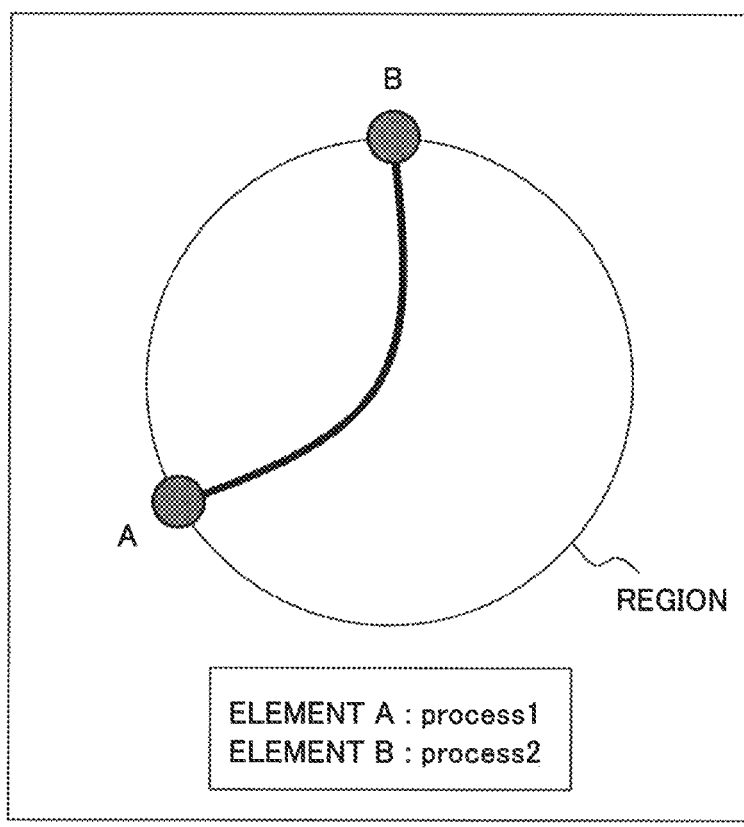
FIG. 3 is a diagram illustrating an example of a relational graph of an anomalous event that is generated by a generation unit of the assistance apparatus according to the second example embodiment of the present disclosure.

Specifically, the generation unit 120 generates a relational graph of the anomalous event based on the anomalous event information. FIG. 3 illustrates an example of a relational graph of an anomalous event generated by the generation unit 120 and displayed on a display screen. It is assumed in this example that both of two elements (element A and element B) are processes and element A is process 1 and element B is process 2 as illustrated in FIG. 3. In the present example embodiment, the generation unit 120 generates a relational graph in which two elements related to an anomalous event are represented by circles, the elements are disposed on an outer edge of a circular region as illustrated in FIG. 3, and the elements are linked by a solid line. The generation unit 120 may also display element names and descriptions of the elements as labels of the elements on the relational graph along with the elements. For example, when the element name of element A is "A", the generation unit 120 may display "A" as a label. Note that each shape of elements, a shape of the region, positions in which the elements are disposed, and the shape of the line that links the elements are not limited to those illustrated in FIG. 3; any shapes and positions that can represent elements and a relation between the elements may be used. It is assumed in the description of the present example embodiment that a relational graph indicated by a solid line represents an anomalous event.

Based on the related event information (surrounding information for the anomalous event), the generation unit 120 then generates relational graphs of related events. At this point, the generation unit 120 may generate relational graphs of the related events by overlaying the relational graphs on the relational graph of the anomalous event. However, for convenience of explanation, the present example embodiment is described by using an example in which relational graphs of the related events are generated separately from the relational graph of the anomalous event.

Figure 4:
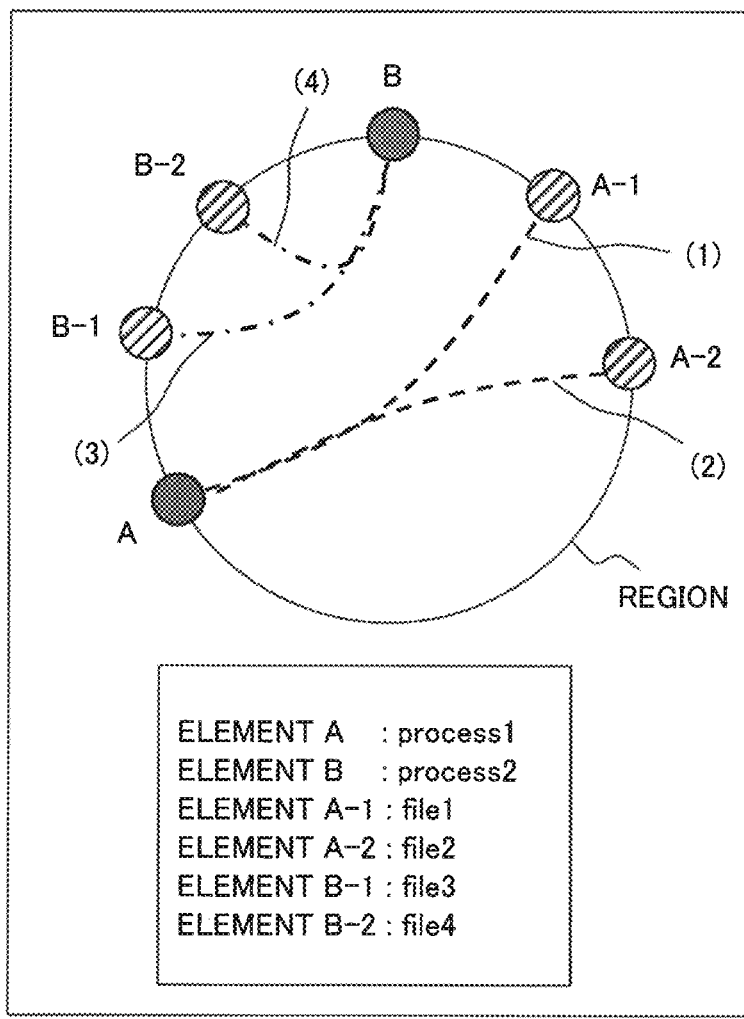
FIG. 4 is a diagram illustrating an example of relational graphs of surrounding information of an anomalous event that is generated by the generation unit of the assistance apparatus according to the second example embodiment of the present disclosure.

FIG. 4 illustrates an example of relational graphs of related events generated by the generation unit 120 and displayed on a display screen. As described above, the related events are events related to elements of an anomalous event. An example similar to the example in FIG. 3 is used in the description. Related events include events other than the anomalous event that are related to element A and events other than the anomalous event that are related to element B. It is assumed for example that the following events are related events and the acquisition unit 110 has acquired information indicating these events.
(1) Element A has accessed element A-1,
(2) element A has accessed element A-2,
(3) element B has accessed element B-1, and
(4) element B has accessed element B-2.
Since the related events (1) to (4) given above are events that have not been detected as anomalous events, the related events (1) to (4) can be said to be normal events or usual events.

The generation unit 120 then generates relational graphs as illustrated in FIG. 4. In this case, the generation unit 120 generates the relational graphs in such a way that the relational graphs indicating the related events (1) to (4) given above are displayed in a mode different from that of the relational graph indicating the anomalous event illustrated in FIG. 3.

For example, the generation unit 120 represents a line that links elements included in a relational graph indicating a related event by using a dashed line, a dash dotted line or the like as depicted in FIG. 4, rather than a solid line. Further, the generation unit 120 may represent a line that links elements included in a relational graph indicating a related event by using a color or thickness different from that of the line included in the relational graph of the anomalous event.

Further, the generation unit 120 may represent related events in different modes for each element. For example, the generation unit 120 may represent a related event related to element A by a dashed line and represent a related event related to element B by a dash dotted line, as illustrated in FIG. 4. Further, the generation unit 120 may represent elements that are not directly related to the anomalous event (element A-1, element A-2, element B-1 and element B-2 in FIG. 4) among the elements related to a related event in a mode different from that of elements of the anomalous event (element A and element B in FIG. 4). An element related to a related event will be hereinafter also referred to as an element of a related event.

Figure 5:
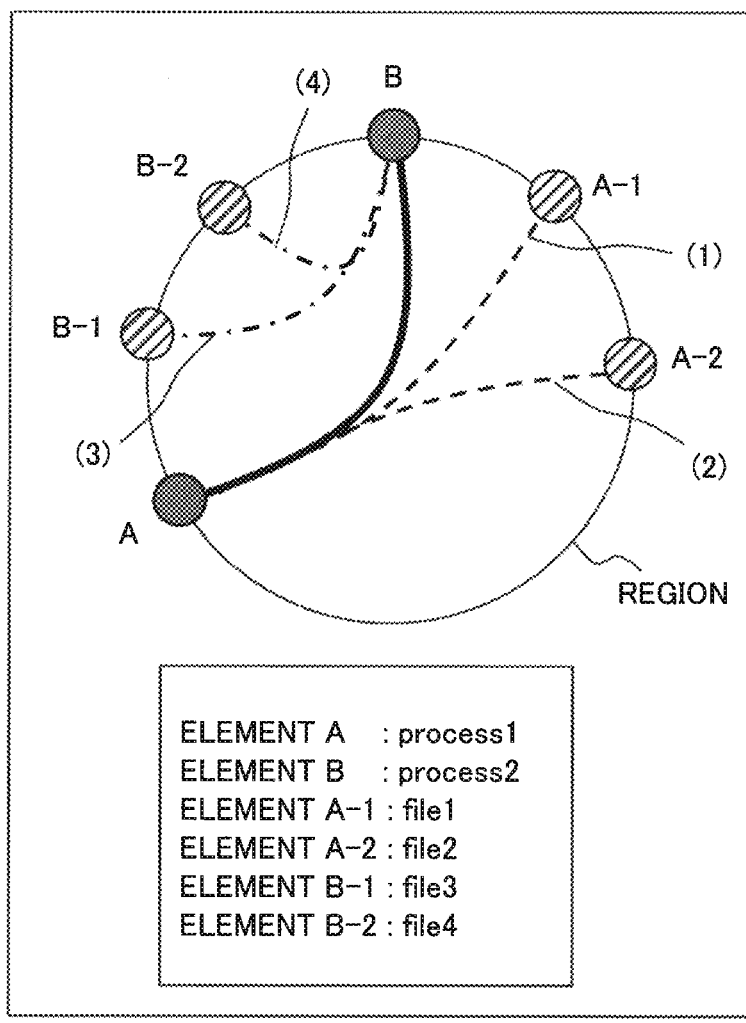
FIG. 5 is a diagram illustrating an example of relational graphs displayed by a display device in the second example embodiment of the present disclosure.

Then, the generation unit 120 combines the relational graphs illustrated in FIGS. 3 and 4. The generation unit 120 causes the generated (combined) relational graph to be displayed on the display screen of the display device 200. An example of relational graphs displayed on the display device 200 is illustrated in FIG. 5. As illustrated in FIG. 5, it can be seen that the generation unit 120 causes surrounding information of an anomalous event to be displayed in a mode different from that of the anomalous event on the relational graph representing the anomalous event.

The display device 200 displays the relational graph generated by the generation unit 120 on the display screen. The display device 200 is implemented by a liquid-crystal display, for example.

While, for convenience of explanation, the present example embodiment has been described by using an example in which there is one anomalous event, there may be a plurality of anomalous events. While the description has been provided by using an example in which a related event acquired by the acquisition unit 110 is an event directly related to an element of the anomalous event (an event with an element that is related with one hop from the element), related events are not limited to this. The number of hops here indicates the number of lines that link elements represented by a relational graph with each other and the number of hops from element A to element B in FIG. 5 is one. The number of hops from element A to element B-2 in FIG. 5 is two.

For example, the acquisition unit 110 may acquire events from an element of an anomalous event, to a related element within a predetermined number of hops. A case will be described in which the predetermined number of hops is two. When there is an event between element A-1 described above and element A-3, element A-3 is an element related with two hops from element A. In this case, the generation unit 120 may generate a relational graph in which (a) a relational graph representing the event between element A and element A-1 and (b) a relational graph representing the event between element A-1 and element A-3 are displayed in different modes.

The number of related events acquired by the acquisition unit 110 is not particularly limited. The acquisition unit 110 may acquire, as related event information, information concerning all events related to at least one element among a plurality of elements related directly or indirectly to an anomalous event out of related event information that can be acquired from the log.

In the example described above, elements that are directly related to an anomalous event are element A and element B. In this case, the acquisition unit 110 may acquire, as related events, all events that are related to element A and/or all events that are related to element B.

Further, when related events up to an element related within a predetermined number of hops from an element of an anomalous event are acquired, elements that are indirectly related to the anomalous event in the example in FIG. 5 are element A-1, element A-2, element B-1 and element B-2. In this case, the acquisition unit 110 may acquire, as related event information, information concerning all events that are related to at least any of these elements.

Further, the acquisition unit 110 may acquire, as related event information, partial event information that is related to at least one element among a plurality of elements that are related to an anomalous event out of related event information that can be acquired from the log. Partial event information may be a predetermined number of pieces of related event information, for example. Partial event information may be, for example, N pieces of event information (N is a natural number) chosen in an order in which the event occurrence time is new from the current time point. Further, partial event information may be N pieces of event information concerning events chosen in order from the event with the largest number of occurrences from among events that have occurred in a certain past time period.

Further, the acquisition unit 110 may acquire the partial event information described above for each element that is related to an anomalous event or may acquire the partial event information described above for all elements that are related to an anomalous event.

As a result, the assistance apparatus 100 can cause the display device 200 to display as many normal events as the number of normal events that the administrator wants to compare with the anomalous event.

Further, related events acquired by the acquisition unit 110 are not limited to events that are directly related to an element of an anomalous event. For example, the acquisition unit 110 may acquire, as related event information, event information related to an element (referred to as a related element) that is related to an element of an anomalous event. For example, when one of elements of an anomalous event is element A and element A is included in group A, an element (referred to as element AA, for example) other than element A that is included in group A is a related element. The acquisition unit 110 may acquire event information related to element AA as related event information from the log.

As a result, the assistance apparatus 100 can cause the display device 200 to display a normal event that is indirectly related to an anomalous event together with the anomalous event.

Further, the acquisition unit 110 may check the storage unit 130 and may acquire related event information each time the log stored in the storage unit 130 is updated or may acquire related event information at predetermined intervals.

(Processing by Assistance Apparatus 100 and Display Device 200)

Figure 6:
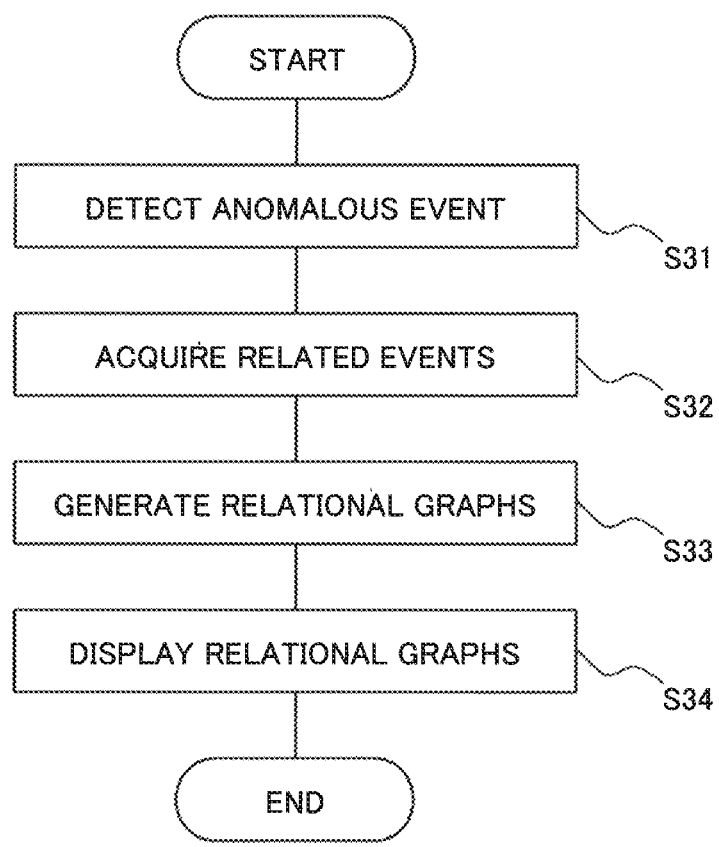
FIG. 6 is a diagram illustrating an example of a flow of processing by the assistance apparatus and the display device according to the second example embodiment of the present disclosure.

A flow of processing by the assistance apparatus 100 and the display device 200 according to the present example embodiment will be described next with reference to FIG. 6. FIG. 6 is a flowchart illustrating an example of a flow of processing by the assistance apparatus 100 according to the present example embodiment.

As illustrated in FIG. 6, the detection unit 140 detects an anomalous event (step S31). Then, the acquisition unit 110 acquires related event information which is surrounding information of the anomalous event (step S32)

Then, the generation unit 120 generates relational graphs of the anomalous event and related events (step S33). Then, the display device 200 displays the relational graphs on the display screen (step S34).

With this, the processing by the assistance apparatus 100 and the display device 200 ends.

Advantageous Effects

In the assistance apparatus 100 according to the present example embodiment, the acquisition unit 110 acquires, as related events, events that are related to an element of an anomalous event detected by the detection unit 140 and are different from the anomalous event. Based on the anomalous event and the related events, the generation unit 120 generates relational graphs respectively representing the anomalous event and the related events. The relational graphs generated by the generation unit 120 at this point are relational graphs such that the related events are displayed in a mode different from that of the anomalous event on the display screen.

Accordingly, a relational graph displayed on the display screen by the display device 200 includes the anomalous event and the related events that are displayed in a mode different from that of the anomalous event.

Therefore, a verifying party (for example, an administrator of the system to be monitored) that checks the display screen can verify the anomalous event and the normal events at the same time. This allows the verifying party to compare the anomalous event that has occurred with the normal events. Accordingly, the verifying party can readily ascertain that the anomalous event is anomalous.

As described above, like the assistance apparatus 10 according to the first example embodiment described above, the assistance apparatus 100 according to the present example embodiment is capable of assisting a verifying party in ascertaining an anomaly in an event of which notification has been made.

Third Example Embodiment

Figure 7:
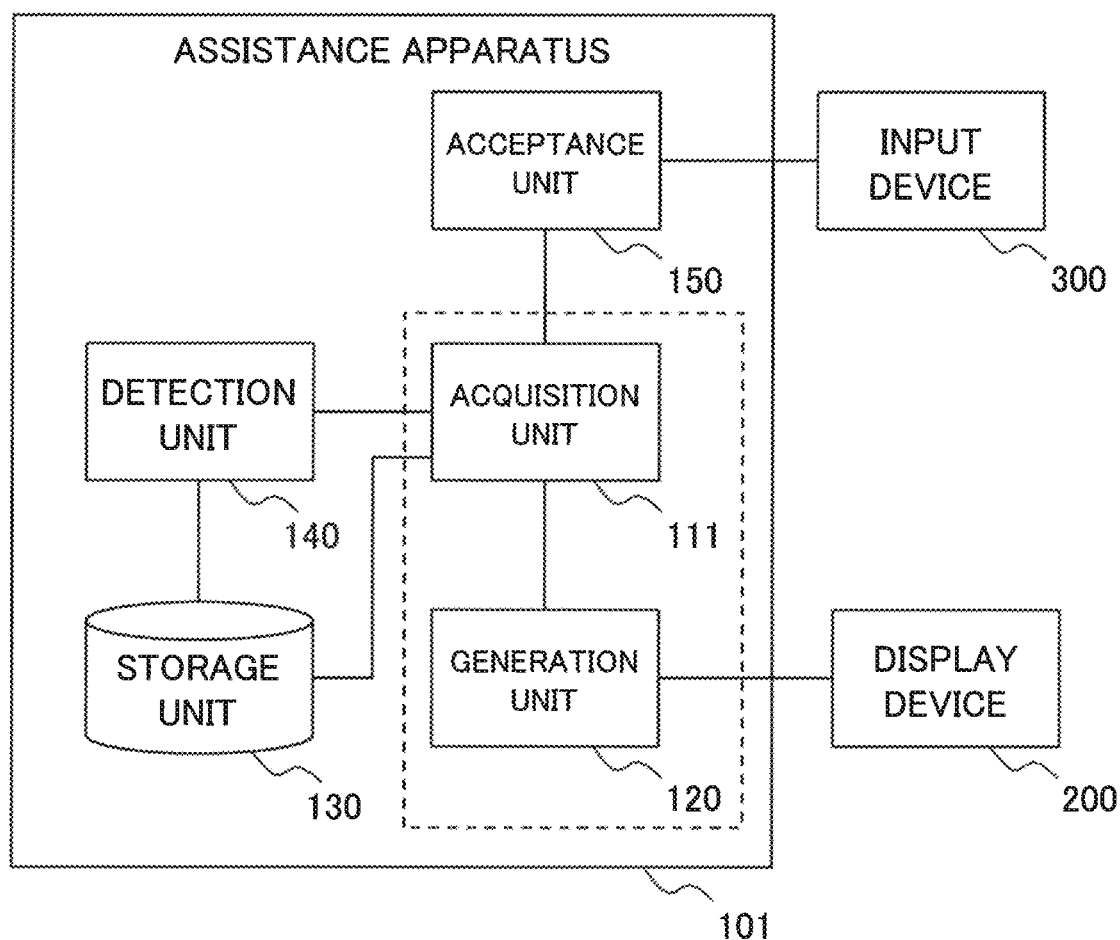
FIG. 7 is a functional block diagram illustrating an example of a functional configuration of an assistance apparatus according to a third example embodiment of the present disclosure.

A third example embodiment of the present disclosure will be described next. FIG. 7 is a functional block diagram illustrating an example of a functional configuration of an assistance apparatus 101 according to the present example embodiment. For convenience of explanation, blocks that have the same functions as blocks included in the drawings described in the embodiments described previously are given the same reference symbols and detailed description thereof will be omitted.

As illustrated in FIG. 7, the assistance apparatus 101 according to the present example embodiment includes an acquisition unit 111, a generation unit 120, a storage unit 130, a detection unit 140 and an acceptance unit 150.

The acceptance unit 150 accepts an input of a display condition from an administrator or the like through an input device 300. The acceptance unit 150 provides the accepted information (condition information) to the acquisition unit 111. The acceptance unit 150 accepts time instant information indicating a time instant of an event or time period information indicating a time period of an event, for example, as a display condition. Further, the acceptance unit 150 may accept information indicating an element, for example, as a display condition.

The input device 300 is implemented by a mouse, a keyboard or the like, for example. While the present example embodiment will be described by taking an example in which a display device 200 and the input device 300 are implemented by devices separate from the assistance apparatus 101, the display device 200 and the input device 300 may be configured to be incorporated in the assistance apparatus 101 as a display unit and an input unit, respectively. In this case, the display unit and the input unit may be implemented as a touch panel, for example.

The acquisition unit 111 relates to the acquisition unit 11 or the acquisition unit 110 described above. The acquisition unit 111 receives anomalous event information from the detection unit 140. In addition, the acquisition unit 111 receives condition information from the acceptance unit 150. The acquisition unit 111 checks whether or not there is an anomalous event that meets a display condition included in the condition information.

For example, when the condition information is time instant information, the display condition will be a condition that an anomalous event that occurred at the time instant represented by the time instant information or in a predetermined time period including the time instant and a related event related to the anomalous event are to be displayed. Accordingly, based on the received anomalous event information, the acquisition unit 111 determines whether or not there is an anomalous event at the time instant represented by the time instant information or in the predetermined time period including the time instant. It is assumed here that the anomalous event information includes information indicating the time instant at which the anomalous event has occurred.

Further, when the condition information is time period information, for example, the display condition will be a condition that an anomalous event that has occurred in the time period represented by the time period information and a related event related to the anomalous event are to be displayed. Accordingly, based on the received anomalous event information, the acquisition unit 111 determines whether or not there is an anomalous event in the time period represented by the time period information. When there is an anomalous event in the time period represented by the time period information, the acquisition unit 111 acquires related event information concerning an event related to an element of the anomalous event from a log stored in the storage unit 130.

Moreover, when the condition information is information of an element, for example, the display condition will be a condition that an anomalous event related to an element represented by the information of the element and a related event related to the anomalous event are to be displayed. Accordingly, based on the received anomalous event information, the acquisition unit 111 determines whether or not there is an anomalous event related to the element indicated by the information of the element. For example, when the condition information is information indicating "process 1", the acquisition unit 111 determines whether or not there is an anomalous event related to the element "process 1". As in the second example embodiment, when an event between "process 1" and "process 2" has been detected as being an anomalous event, the acquisition unit 111 determines that there is an anomalous event that is related to the element "process 1". The acquisition unit 111 then acquires information concerning events (related events (1) to (4) described in the second example embodiment) that are related to the element of the anomalous event.

Note that acquisition of related event information performed by the acquisition unit 111 is similar to that of the acquisition unit 110 and therefore detailed description thereof will be omitted. When the condition information is time instant information or time period information, related event information acquired by the acquisition unit 111 may be information indicating an event at the time instant represented by the time instant information or in the predetermined time period including the time instant, or in the time period indicated by the time period information.

Then, the generation unit 120 generates relational graphs based on the anomalous event information and the related event information acquired by the acquisition unit 111.

(Processing by Assistance Apparatus 101 and Display Device 200)

Figure 8:
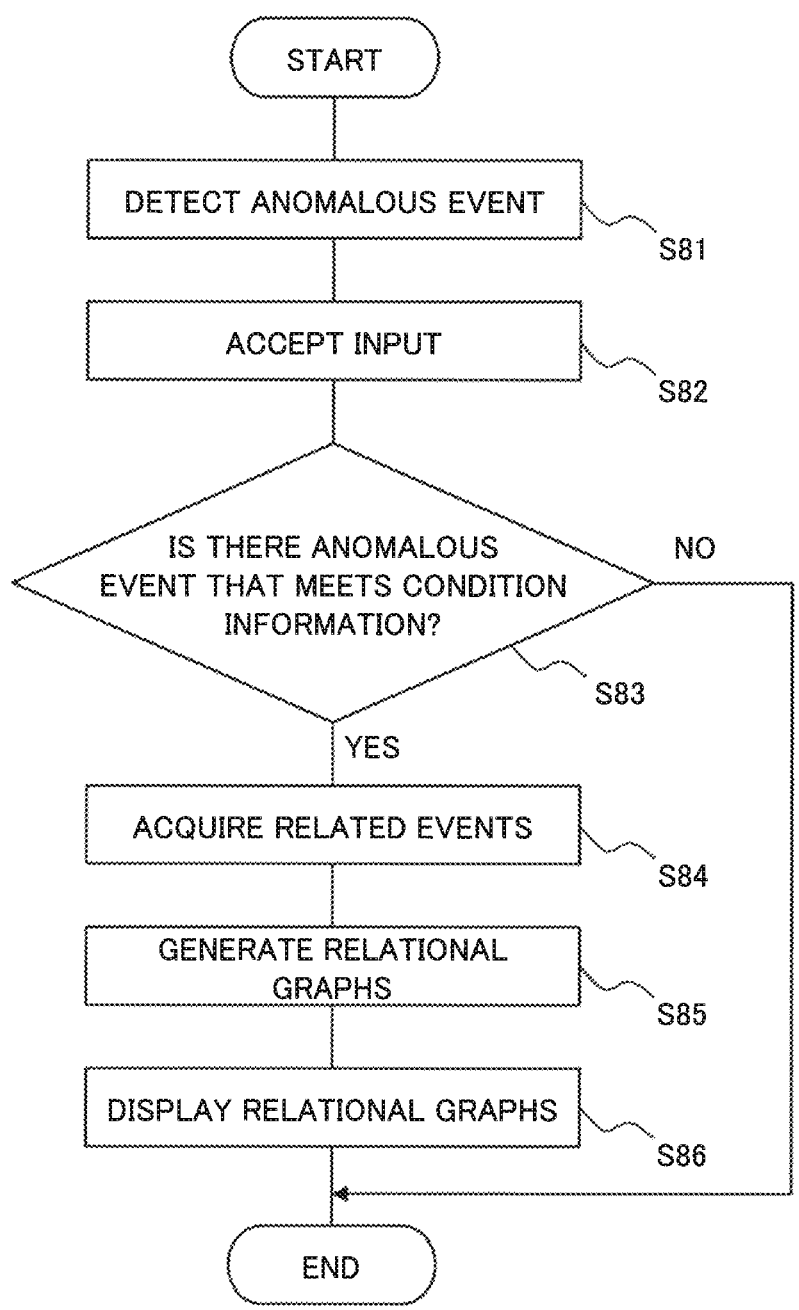
FIG. 8 is a flowchart illustrating an example of a flow of processing by the assistance apparatus and a display device according to the third example embodiment of the present disclosure.

A flow of processing by the assistance apparatus 101 and the display device 200 according to the present example embodiment will be described next with reference to FIG. 8. FIG. 8 is a flowchart illustrating an example of a flow of processing by the assistance apparatus 101 according to the present example embodiment.

As illustrated in FIG. 8. the detection unit 140 detects an anomalous event (step S81). The acceptance unit 150 accepts an input (step S82). Note that step S81 and step S82 may be performed concurrently or in the reverse order.

Then, the acquisition unit 111 checks whether or not there is an anomalous event that meets a display condition included in condition information (step S83). When there is not an anomalous event that meets the display condition included in the condition information (NO at step S83), the assistance apparatus 101 ends the processing. Note that the assistance apparatus 101 may display a screen that accepts other inputs on the display screen or may continue performing step S101 until an anomalous event that meets the display condition included in the condition information is detected.

When there is an anomalous event that meets the display condition included in the condition information (YES at step S83), the acquisition unit 111 acquires related event information which is surrounding information of the anomalous event (step S84).

Then, the generation unit 120 generates relational graphs of the anomalous event and related events (step S85). Then, the display device 200 displays the relational graphs on the display screen (step S86).

With this, the processing by the assistance apparatus 101 and the display device 200 ends.

Advantageous Effects

The assistance apparatus 101 according to the present example embodiment has effects similar to the first and second example embodiments described above. In addition, in the assistance apparatus 101 according to the present example embodiment, the acquisition unit 111 acquires related events that are related to an anomalous event that matches a display condition. As a result, relational graphs generated by the generation unit 120 matches the display condition. Accordingly, an administrator can check, on the display screen, the relational graphs alone that the administrator wants to check. Thus, according to the assistance apparatus 101 of the present example embodiment, it is possible to support the ascertaining of an anomalous event by an administrator more reliably.

Fourth Example Embodiment

A fourth example embodiment of the present disclosure will be described next. In the third example embodiment described above, the description has been provided about generation of a relational graph based on condition information accepted by the acceptance unit 150. In the present example embodiment, a configuration will be described in which an input for a relational graph displayed on a display device 200 is accepted from an administrator or the like.

Figure 9:
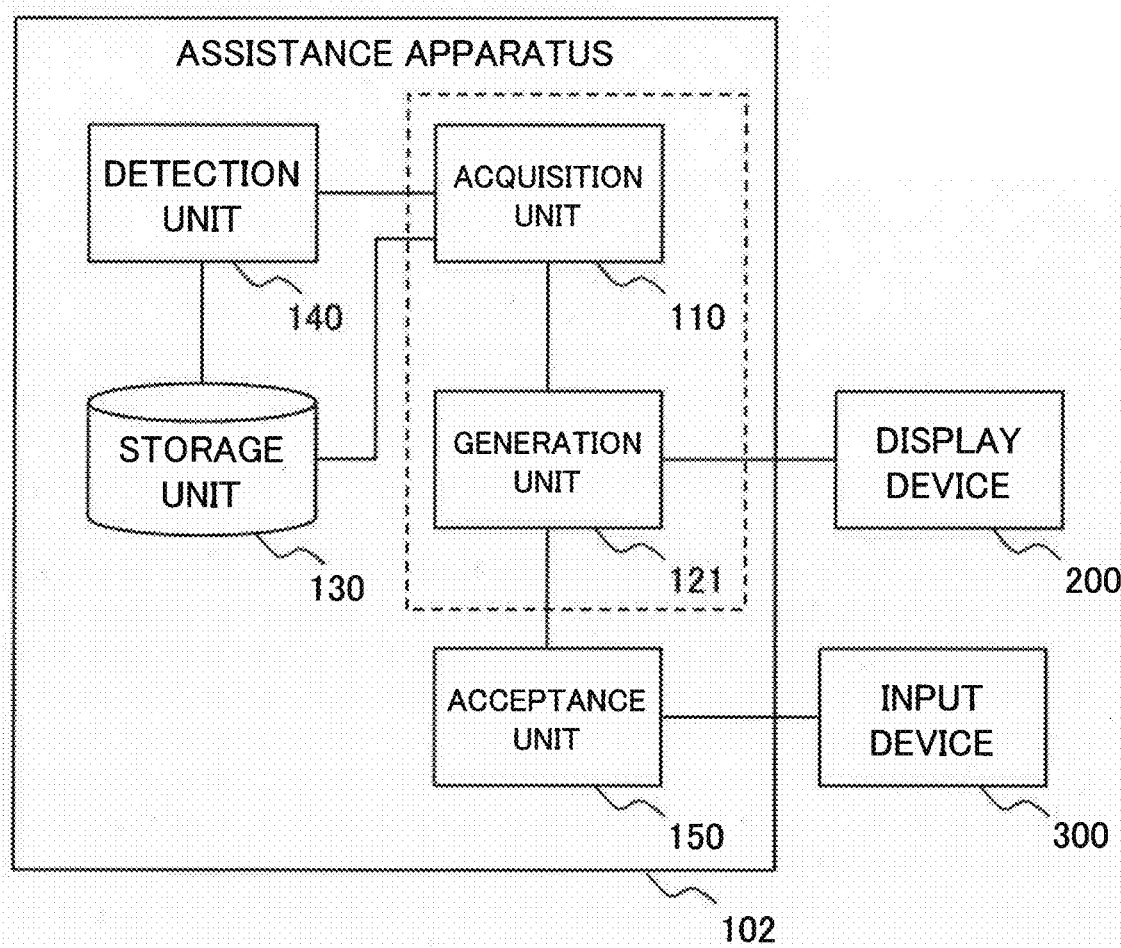
FIG. 9 is a functional block diagram illustrating an example of a functional configuration of an assistance apparatus according to a fourth example embodiment of the present disclosure.

FIG. 9 is a functional block diagram illustrating an example of a functional configuration of an assistance apparatus 102 according to the present example embodiment. For convenience of explanation, blocks having the same functions as blocks included in the drawings described in the embodiments described previously are given the same reference symbols and detailed description thereof will be omitted.

As illustrated in FIG. 9, the assistance apparatus 102 according to the present example embodiment includes an acquisition unit 110, a generation unit 121, a storage unit 130, a detection unit 140 and an acceptance unit 150.

As in the third example embodiment described above, the acceptance unit 150 accepts inputs from an administrator or the like through an input device 300. The acceptance unit 150 provides accepted condition information to the generation unit 121.

Like the generation unit 120 in the second example embodiment, the generation unit 121 generates relational graphs representing an anomalous event and related events that are related to the anomalous event. When the generation unit 121 accepts condition information from the acceptance unit 150, the generation unit 121 generates relational graphs representing an anomalous event that meets a display condition indicated by the condition information and related events. The generation unit 121 then causes the generated relational graphs to be displayed on a display screen of a display device 200.

Note that the condition information accepted by the acceptance unit 150 is preferably information representing a display condition that can be input based on the relational graph displayed on the display device 200. The condition information is preferably information indicating any of elements included in the relational graph displayed on the display device 200, for example.

(Processing by Assistance Apparatus 102 and Display Device 200)

A flow of processing by the assistance apparatus 102 and the display device 200 according to the present example embodiment will be described next with reference to FIG.

Figure 10:
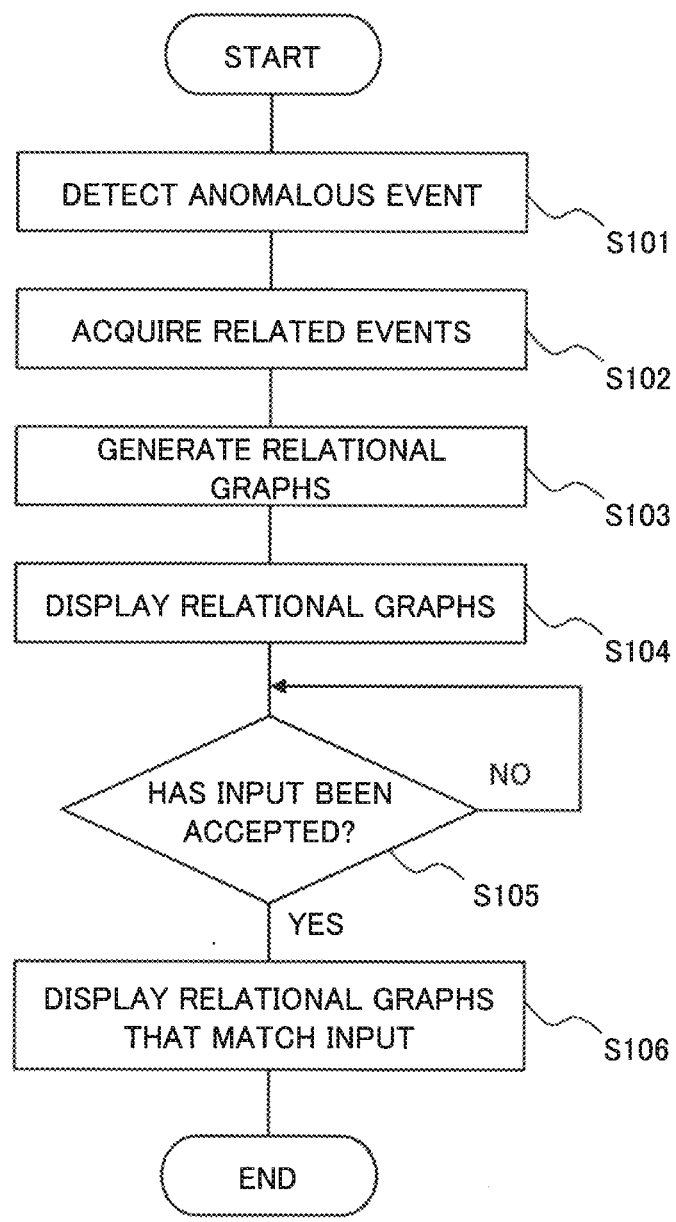
FIG. 10 is a flowchart illustrating an example of a flow of processing by the assistance apparatus and a display device according to the fourth example embodiment of the present disclosure.

10. FIG. 10 is a flowchart illustrating an example of a flow of processing by the assistance apparatus 102 according to the present example embodiment.

As illustrated in FIG. 10, the detection unit 140 detects an anomalous event (step S101). Then, the acquisition unit 110 acquires related event information which is surrounding information of the anomalous event (step S102).

Then, the generation unit 121 generates relational graphs of the anomalous event and related events (step S103). Then, the display device 200 displays the relational graphs on the display screen (step S104).

Then, the acceptance unit 150 determines whether or not the acceptance unit 150 has accepted an input (step S105). When no input has been accepted (NO at step S105), the acceptance unit 150 repeats step S105. When an input has been accepted (YES at step S105), the generation unit 121 generates relational graphs that match input condition information and causes the relational graphs to be displayed on the display screen of the display device 200 (step S106).

With this, the processing by the assistance apparatus 102 and the display device 200 ends.

Figure 11:
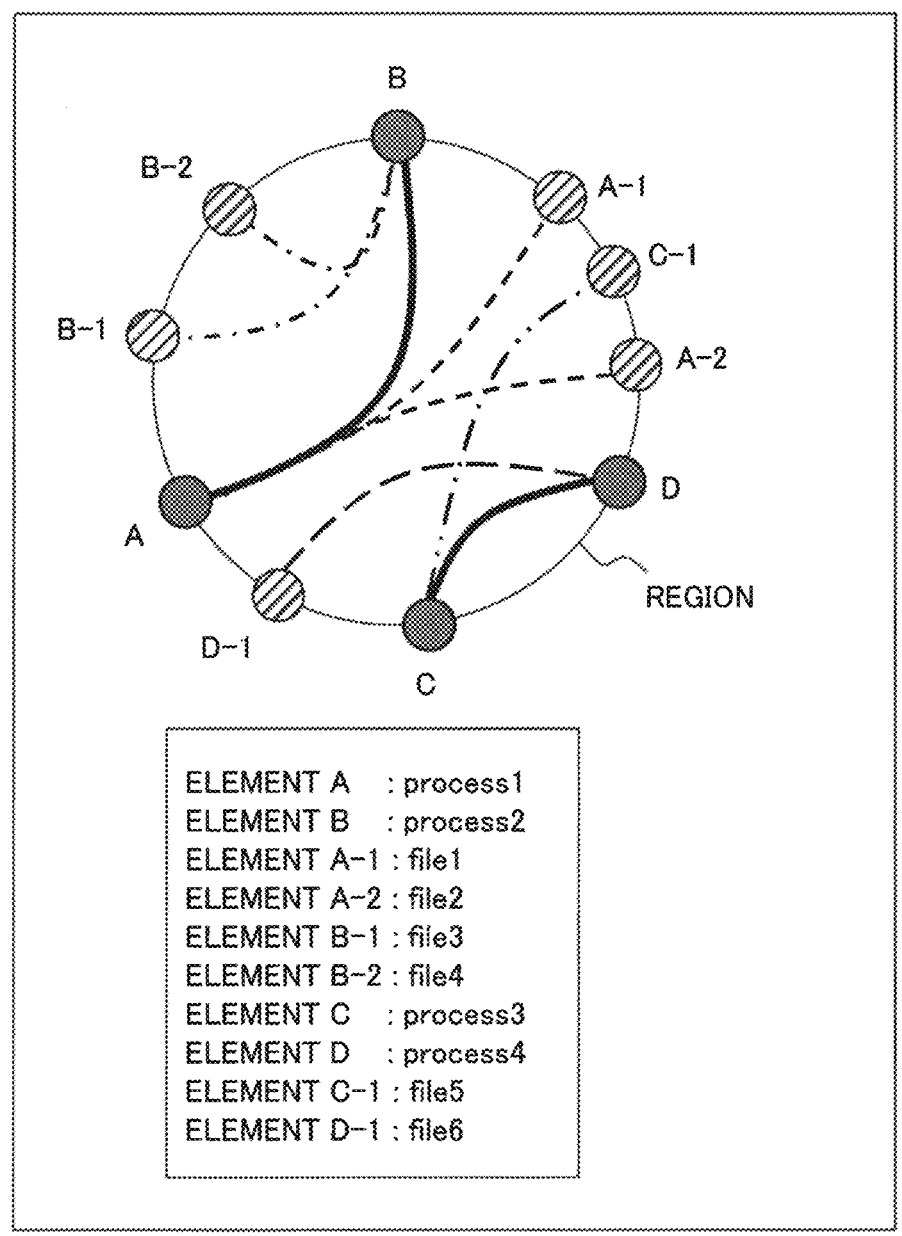
FIG. 11 is a diagram illustrating an example of relational graphs displayed by the display device in the fourth example embodiment of the present disclosure.
Figure 12:
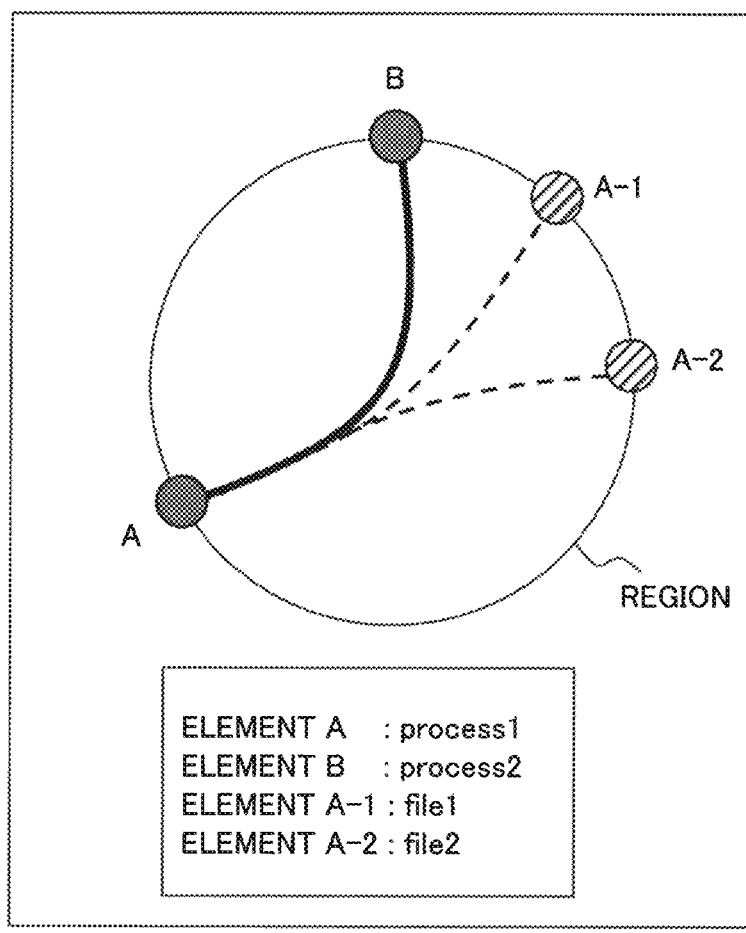
FIG. 12 is a diagram illustrating another example of relational graphs displayed by the display device in the fourth example embodiment of the present disclosure.

Relational graphs displayed on the display device 200 will be described by using FIGS. 3 to 5 and FIGS. 11 and 12. First, FIG. 11 is a diagram illustrating an example of relational graphs displayed on the display screen at step S104. In addition to the relational graphs described by using FIG. 5, FIG. 11 includes relational graphs representing an anomalous event between element C and element D, a related event between element C and element C-1, and a related event between element D and element D-1.

Note that description will be made below by taking an example in which an administrator has input, as a display condition, a condition that an anomalous event that is related to element A and related events are to be displayed from the relational graphs illustrated in FIG. 11.

In this case, a relational graph of the anomalous event related to element A is the relational graph illustrated in FIG. 3 and related events related to the anomalous event are the relational graphs illustrated in FIG. 4. Accordingly, the generation unit 121 generates the relational graphs illustrated in FIG. 5 and causes the display device 200 to display the relational graphs in step S106.

Note that the generation unit 121 may generate relational graphs of only related events that are directly related to the condition information. For example, in the case described above, related events that are related to element A are graphs (1) and (2) illustrated in FIG. 5. Accordingly, the generation unit 121 may generate relational graphs illustrated in FIG. 12 and may cause the relational graphs to be displayed on the display device 200 in step S106.

Advantageous Effects

The assistance apparatus 102 according to the present example embodiment has effects similar to those of the first and second example embodiments described above. Further, in the assistance apparatus 102 according to the present example embodiment, the generation unit 121 generates relational graphs representing an anomalous event that matches a display condition and related events and causes the relational graphs to be displayed on a display screen. This allows an administrator or the like to check, on the display screen, the relational graphs alone that the administrator or the like wants to check. Accordingly, the assistance apparatus 102 according to the present example embodiment is capable of assisting an administrator in more reliably ascertaining an anomalous event.

(Hardware Configuration)

Figure 13:
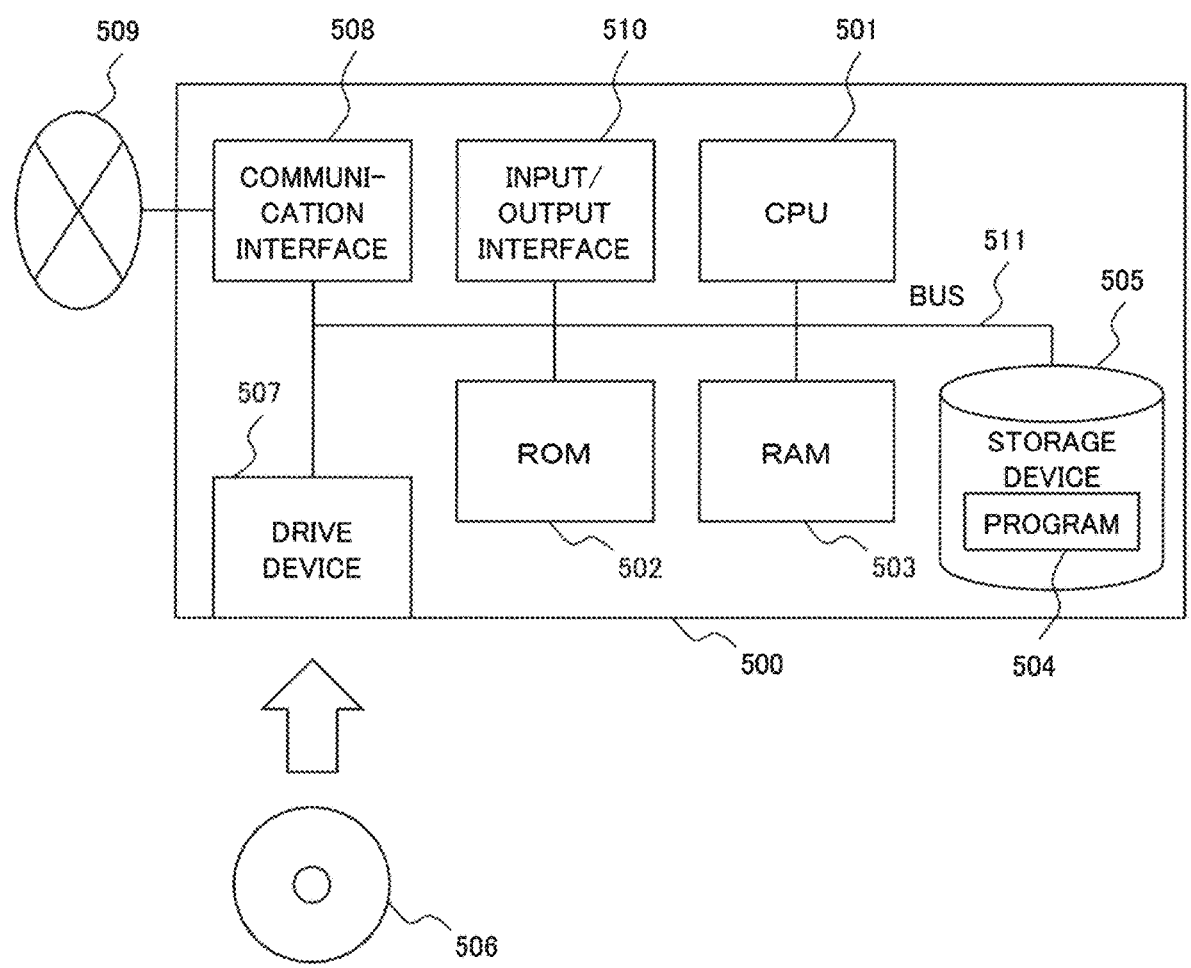
FIG. 13 is a diagram illustrating, by way of example, a hardware configuration of a computer (an information processing device) that is capable of implementing each example embodiment of the present disclosure.

Each component of each apparatus in each example embodiment of the present disclosure represents a functional-unit block. Part or whole of each component of each apparatus can be implemented by any combination of an information processing device 500 as illustrated in FIG. 13, for example, and a program. The information processing device 500 includes the following configuration as an example.

A central processing unit (CPU) 501
A read only memory (ROM) 502
A random access memory (RAM) 503
A program 504 to be loaded into the RAM 503
A storage device 505 storing the program 504
A drive device 507 that writes and reads to and from a recording medium 506
A communication interface 508 that connects to a communication network 509
An input/output interface 510 that inputs and outputs data
A bus 511 that connects components Each component of each apparatus in each example embodiment is implemented by the CPU 501 acquiring and executing the program 504 that implements functions of these components. The program 504 that implements the functions of the components of each apparatus is stored in the storage device 505 or the RAM 503 in advance and the CPU 501 reads the program 504 as necessary. Note that the program 504 may be provided to the CPU 501 via the communication network 509 or may be stored in the recording medium 506 in advance and the drive device 507 may read out and provide the program to the CPU 501.

There are various variations of the method for implementing each apparatus. For example, each of the components of each apparatus may be implemented by any combination of a separate information processing device 500 and a program. Alternatively, a plurality of components of each apparatus may be implemented by any combination of one information processing device 500 and a program.

Part or whole of each component of each apparatus is implemented by other general-purpose or special purpose circuitry, a processor or the like or a combination of them. They may be formed by a single chip or may be formed by a plurality of chips connected via a bus.

Part or whole of each component of each apparatus may be implemented by a combination of circuitry or the like described above and a program.

When part or whole of each component of each apparatus is implemented by a plurality of information processing devices, pieces of circuitry or the like, the plurality of information processing devices, pieces of circuitry or the like may be arranged in a centralized manner or arranged in a distributed manner. For example, the information processing devices, the pieces of circuitry or the like may be implemented in the form of a client-server system, a cloud computing system or the like in which the information processing devices, the pieces of circuitry or the like are each connected via a communication network.

Note that the example embodiments described above are preferable example embodiment of the present disclosure, are not intended to limit the scope of the present disclosure to the example embodiments described above, and those skilled in the art can construct a form by making modifications, substitutions and various changes to the example embodiments described above without departing from the spirit of the present disclosure.

This application is based upon and claims the benefit of priority from Japanese Patent Application No. 2015-235364 filed on Dec. 2, 2015, the entire disclosure of which is incorporated herein by reference.

REFERENCE SIGNS LIST

10 Assistance apparatus
11 Acquisition unit
12 Generation unit
100 Assistance apparatus
101 Assistance apparatus
102 Assistance apparatus
110 Acquisition unit
111 Acquisition unit
120 Generation unit
121 Generation unit
130 Storage unit
140 Detection unit
150 Acceptance unit
200 Display device
300 Input device

What is claimed is:

1. An anomalous event confirmation assistance apparatus comprising:
one or more processors configured to;
store, in a storage unit, a log of detecting events between a plurality of elements monitored on a monitored system that includes multiple hosts connected via a network;
acquire, from the log, for an element related to an event detected as an anomalous event among the events between the plurality of the elements, an event that is related to the element and is different from the anomalous event, as a related event, wherein the related event is one of one or more events related to the anomalous event; and
generate, based on the anomalous event, a relational graph that has the elements as a vertices and a relation between the elements as a side and represents each of the anomalous event, and
generate, based on the related event, a relational graph that has the elements as vertices and a relation between the elements as a side and represents each of the related event, by overlaying the generated relational graph of the anomalous event, wherein
the related event in the generated relational graph of the anomalous event and the related event is displayed on a display screen in a mode different from a mode of the anomalous event,
each of the elements is one of a host, a process, a file and an account,
when two elements of the elements are hosts, an event between the two elements is that data are transmitted,
when one of two elements of the elements is a process and another of the two element is a file, an event between the two elements is that the process is accessed to the file, and
when one of two elements of the elements is a process, an event between the two elements is that the process is executed by the account.

2. The anomalous event confirmation assistance apparatus according to claim 1, wherein the one or more processors are configured to
accept an input of a display condition, wherein
acquire, for an element related to an anomalous event that matches the display condition, the related event related to the element.

3. The anomalous event confirmation assistance apparatus according to claim 1, wherein the one or more processors are configured to
accept an input of a display condition, wherein generate the relational graph representing the anomalous event that matches the display condition and the related event.

4. The anomalous event confirmation assistance apparatus according to claim 1, wherein the one or more processors are configured to acquire, for an element included between an element related to the anomalous event and a related element within a predetermined number of hops, an event related to the element as the related event.

5. The anomalous event confirmation assistance apparatus according to claim 1, wherein the one or more processors are configured to acquire, as the related event, every event related to at least one of a plurality of elements related to the anomalous event.

6. The anomalous event confirmation assistance apparatus according to claim 1, wherein the one or more processors are configured to
acquire, as the related event, a predetermined number of events chosen in an order in which the event occurrence time is new, or a predetermined number of events chosen in descending order of number of occurrences out of events that occur in a certain past time period, among events related to at least one of a plurality of elements related to the anomalous event.

7. The anomalous event confirmation assistance apparatus according to claim 1, wherein the acquisition unit acquires, for a related element related to an element of the anomalous event, an event related to the related element as the related event.

8. The anomalous event confirmation assistance apparatus according to claim 1, wherein the one or more processors are configured to detect unit which detects the anomalous event.

9. The anomalous event confirmation assistance apparatus according to claim 1, wherein the one or more processors are configured to display the relational graph on the display screen, a display unit includes the display screen.

10. An anomalous event confirmation assistance method executed by one or more processors comprising:
storing, in a storage unit, a log of detecting events between a plurality of elements monitored on a monitored system that includes multiple hosts connected via a network;
acquiring, for an element related to an event detected as an anomalous event among the events between the plurality of the elements, an event that is related to the element and is different from the anomalous event, as a related event, wherein the related event is one of one or more events related to the anomalous event; and
generating, based on the anomalous event, a relational graph that has the elements as vertices and a relation between the elements as a side and represents each of the anomalous event, and
generate, based on the related event, a relational graph that has the elements as vertices and a relation between the elements as a side and represents each of the related event, by overlaying the generated relational graph of the anomalous event, wherein
the related event in the generated relational graph of the anomalous event and the related event is displayed on a display screen in a mode different from a mode of the anomalous event,
each of the elements is one of a host, a process, a file and an account, when two elements of the elements are hosts, an event between the two elements is that data are transmitted, when one of two elements of the elements is a process and another of the two element is a file, an event between the two elements is that the process is accessed to the file, and when one of two elements of the elements is a process, an event between the two elements is that the process is executed by the account.

11. The anomalous event confirmation assistance method according to claim 10, further comprising:

accepting an input of a display condition; and, when acquiring the related event, acquiring, for an element related to an anomalous event that matches the display condition, the related event related to the element.

12. The anomalous event confirmation assistance method according to claim 10, further comprising:

accepting an input of a display condition; and generating the relational graph representing the anomalous event that matches the display condition and the related event.

13. A computer-readable non-transitory recording medium on which an anomalous event confirmation program is recorded, the anomalous event confirmation program causing a computer to execute:

a process of storing, in a storage unit, a log of detecting events between a plurality of elements monitored on a monitored system that includes multiple hosts connected via a network;

a process of acquiring, for an element related to an event detected as an anomalous event among the events between the plurality of the elements, an event that is related to the elements and is different from the anomalous event, as a related event, wherein the related event is one of the one or more events related to the anomalous event; and a process of generating, based on the anomalous event, a relational graph that has the elements as vertices and a relation between the elements as a side and represents each of the anomalous event, and a process of generating, based on the related event, a relational graph that has the elements as vertices and a relation between the elements as a side and represents each of the related event, by overlaying the generated relational graph of the anomalous event, wherein the related event in the generated relational graph of the anomalous event and the related event is displayed on a display screen in a mode different from a mode of the anomalous event, each of the elements is one of a host, a process, a file and an account, when two elements of the elements are hosts, an event between the two elements is that data are transmitted, when one of two elements of the elements is a process and another of the two element is a file, an event between the two elements is that the process is accessed to the file, and when one of two elements of the elements is a process, an event between the two elements is that the process is executed by the account.

14. The computer-readable non-transitory recording medium according to claim 13 on which a program is recorded, the program causing the computer to further execute a process of accepting an input of a display condition, wherein the process of acquiring acquires, for an element related to an anomalous event that matches the display condition, the related event related to the element.

15. The computer-readable non-transitory recording medium according to claim 13 on which a program is recorded, the program causing the computer to further execute a process of accepting an input of a display condition, wherein the process of generating generates the relational graph representing the anomalous event that matches the display condition and the related event.

* * * * *